United States Patent
Lu et al.

(10) Patent No.: US 11,577,229 B2
(45) Date of Patent: Feb. 14, 2023

(54) PHOSPHORUS-DOPED TUBULAR CARBON NITRIDE MICRO-NANO MATERIAL AND APPLICATION THEREOF IN CATALYTIC TREATMENT OF EXHAUST GAS

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 489 days.

(21) Appl. No.: 16/809,667

(22) Filed: Mar. 5, 2020

(65) Prior Publication Data

US 2020/0282384 A1    Sep. 10, 2020

(30) Foreign Application Priority Data

Mar. 5, 2019 (CN) .......................... 201910165584.0

(51) Int. Cl.
*B01J 27/00* (2006.01)
*B01J 27/24* (2006.01)
(Continued)

(52) U.S. Cl.
CPC ............ *B01J 27/24* (2013.01); *B01D 53/007* (2013.01); *B01D 53/8628* (2013.01); *B01J 35/004* (2013.01); *B01J 35/0013* (2013.01); *B01J 35/02* (2013.01); *B01J 37/04* (2013.01); *B01J 37/082* (2013.01); *B01J 37/105* (2013.01); *B01D 2255/70* (2013.01); *B01D 2255/802* (2013.01); *B01D 2259/802* (2013.01)

(58) Field of Classification Search
None
See application file for complete search history.

(56) References Cited

FOREIGN PATENT DOCUMENTS

| CN | 105126893 A | * | 12/2015 | ......... | C01B 21/0605 |
| CN | 105236364 A | * | 1/2016 | | |

(Continued)

OTHER PUBLICATIONS

CN-105126893-A—English translation (Year: 2015).*

(Continued)

*Primary Examiner* — Stefanie J Cohen
(74) *Attorney, Agent, or Firm* — SZDC Law P.C.

(57) ABSTRACT

The invention discloses a phosphorus-doped tubular carbon nitride micro-nano material and application thereof in waste gas treatment. Melamine is partially hydrolyzed into cyanuric acid through a phosphorous acid-assisted hydrothermal method to form a melamine-cyanuric acid super molecular precursor; the center of the precursor starts to be pyrolyzed under heating calcination, and thus phosphorus-doped tubular carbon nitride is obtained; the phosphorus-doped tubular carbon nitride and sodium borohydride are mixed and subjected to low-temperature calcination in an inert gas atmosphere, and defect-modified phosphorus-doped tubular carbon nitride is obtained. The defect-modified phosphorus-doped tubular carbon nitride micro-nano material has a good photocatalytic effect on catalytic degradation of waste gas; besides, the production raw materials are abundant and easy to obtain, and the phosphorus-doped tubular carbon nitride micro-nano material is good in stability and recyclable and has application prospects in waste gas treatment.

1 Claim, 4 Drawing Sheets

(51) Int. Cl.

| | |
|---|---|
| *B01J 35/00* | (2006.01) |
| *B01J 35/02* | (2006.01) |
| *B01J 37/10* | (2006.01) |
| *B01J 37/08* | (2006.01) |
| *B01D 53/00* | (2006.01) |
| *B01D 53/86* | (2006.01) |
| *B01J 37/04* | (2006.01) |

(56) References Cited

FOREIGN PATENT DOCUMENTS

| CN | 106629638 A | * | 5/2017 | ......... C01B 21/0605 |
|---|---|---|---|---|
| CN | 107744824 A | * | 3/2018 | ............. B01J 27/24 |

OTHER PUBLICATIONS

Guo et al, Phosphorus-Doped Carbon Nitride Tubes with a Layered Micro-nanostructure for Enhanced Visible-Light Photocatalytic Hydrogen Evolution, angew. chem. int. ed., 55, pp. 1830-1834 (Year: 2016).*
Guo et al, Phosphorus-Doped Carbon Nitride Tubes with a Layered Micro-nanostructure for Enhanced Visible-Light Photocatalytic Hydrogen Evolution, angew. chem. int. ed., supplemental (Year: 2016).*
CN-105236364-A—English translation (Year: 2016).*
CN-106629638-A—English translation (Year: 2017).*
Wen et al, Defective g-C3N4 Prepared by the NaBH4 Reduction for High-Performance H2 Production, ACS sustainable chem, eng, pp. 2343-2349 (Year: 2018).*
CN-107744824-A, English translation (Year: 2018).*

* cited by examiner

PHOSPHORUS-DOPED TUBULAR CARBON NITRIDE MICRO-NANO MATERIAL AND APPLICATION THEREOF IN CATALYTIC TREATMENT OF EXHAUST GAS

This application claims priority to Chinese Patent Application No.: 201910165584.0, filed on Mar. 5, 2019, which is incorporated by reference for all purposes as if fully set forth herein.

FIELD OF THE INVENTION

The present invention relates to the technical field of micro-nano materials, in particular to a defect-modified phosphorus-doped tubular carbon nitride material, a preparation method thereof and application in treatment of exhaust gas.

TECHNICAL BACKGROUND

With the rapid increase in the number of cars in recent years, the massive emissions of automobile exhausts have caused a series of environmental problems such as smog and acid rain, which have damaged the ecological environment and seriously endangered human health.

Semiconductor photocatalysis is a promising technology with a wide range of applications in environmental restoration, solar energy conversion and energy supply. Graphitic carbon nitride ($g-C_3N_4$) has been a hot research topic since its discovery because of its unique electronic properties and a suitable band gap. However, the existing technology makes the catalytic efficiency of carbon nitride low, therefore, finding a new method for high-performance carbon nitride is required.

SUMMARY OF THE INVENTION

The purpose of the present invention is to provide a defect-modified phosphorus-doped tubular carbon nitride micro-nano material and a preparation method thereof. With phosphorous acid-assisted hydrothermal method, melamine is partially hydrolyzed into cyanuric acid to form a melamine-cyanuric acid supramolecular precursor. Then the phosphorus-doped tubular carbon nitride (PTCN) is obtained from the supramolecular precursor after thermal treatment. The PTCN is mixed with $NaBH_4$, followed by heating and calcination at an appropriate temperature to obtain the defect-modified phosphorus-doped tubular carbon nitride (D-PTCN) to achieve the treatment of NO in exhaust gas.

In order to achieve the above purpose, the present invention adopts the following specific technical solutions:

A phosphorus-doped tubular carbon nitride micro-nano material, characterized in that the preparation method of the phosphorus-doped tubular carbon nitride micro-nano material including the following steps:

(1) in the presence of phosphorous acid and water, hydrothermally reacting melamine, and then calcining it to obtain phosphorus-doped tubular carbon nitride, (2) mixing and calcing said phosphorus-doped tubular carbon nitride with sodium borohydride to obtain a phosphorus-doped tubular carbon nitride micro-nano material.

A phosphorus-doped tubular carbon nitride, characterized in that the preparation method of the phosphorus-doped tubular carbon nitride comprising the following steps: in the presence of phosphorous acid and water, hydrothermally reacting melamine, and then calcining it to obtain phosphorus-doped tubular carbon nitride.

Further, the present invention also discloses a preparation method of the above materials, as follows:

A preparation method of a phosphorus-doped tubular carbon nitride micro-nano material including the following steps:

(1) in the presence of phosphorous acid and water, hydrothermally reacting melamine, and then calcining it to obtain phosphorus-doped tubular carbon nitride, (2) mixing and calcing said phosphorus-doped tubular carbon nitride with sodium borohydride to obtain a phosphorus-doped tubular carbon nitride micro-nano material.

A preparation method of the phosphorus-doped tubular carbon nitride comprising the following steps: in the presence of phosphorous acid and water, hydrothermally reacting melamine, and then calcining it to obtain phosphorus-doped tubular carbon nitride.

The present invention also discloses an exhaust gas treatment method, comprising the following steps:

(1) in the presence of phosphorous acid and water, hydrothermally reacting melamine, and then calcining it to obtain phosphorus-doped tubular carbon nitride, (2) mixing and calcing said phosphorus-doped tubular carbon nitride with sodium borohydride to obtain a phosphorus-doped tubular carbon nitride micro-nano material;

(3) passing the exhaust gas to be treated through the phosphorus-doped tubular carbon nitride or the phosphorus-doped tubular carbon nitride micro-nano material, and completing the exhaust gas treatment under illumination.

In the present invention, in the step (1), the temperature of hydrothermal reaction is 180° C. and the time is 10 h; the calcination is carried out in an argon atmosphere, the heating rate is 2.5° C./min, the time is 4 h, and the calcination temperature is 500° C.; the ratio of melamine, phosphorous acid and water is 1 g:1.2 g:100 mL. Preferably, after the hydrothermal reaction is completed, the reactants are centrifuged, washed with water, dried, and then calcined.

In the present invention, in the step (2), the calcination is carried out in an argon atmosphere, the heating rate is 10° C./min, the time is 30 min, and the calcination temperature is 150° C. to 250° C. The calcination temperature is preferably 150° C., 200° C., or 250° C. The mass ratio of the phosphorus-containing tubular carbon nitride and the sodium borohydride is 5:1. Preferably, the calcined reactants are washed with hydrochloric acid and sodium hydroxide solution, then washed with ultrapure water to neutrality, and finally dried to obtain phosphorus-doped tubular carbon nitride micro-nano materials.

In the present invention, in the step (3), the illumination is provided by a 300 W xenon lamp.

The present invention discloses the application of the above-mentioned phosphorus-doped tubular carbon nitride micro-nano material or phosphorus-doped tubular carbon nitride in the preparation of exhaust gas treatment materials or exhaust gas treatment. The exhaust gas is preferably an exhaust gas containing NO.

The invention creatively adopts a simple phosphorous acid-assisted hydrothermal method to prepare a phosphorus-doped tubular carbon nitride micro-nano material, which has many advantages such as a tubular structure that promotes catalytic performance, the doping of phosphorus makes the band gap smaller, low cost, etc. D-PTCN is a good semiconductor catalyst, which realizes the defect-modified phosphorus-doped tubular carbon nitride micro-nano structure and excellent catalytic performance.

Advantages of the Invention

1. In the present invention, the defect-modified phosphorus-doped tubular carbon nitride micro-nano material is a good semiconductor catalyst, which has a tubular structure, a small band gap, an increased active site and a low cost. The defect modification can enhance the separation efficiency of electrons and holes, enlarge the absorption of light, and promote the catalytic performance.

2. In the present invention, carbon nitride in the defect-modified phosphorus-doped tubular carbon nitride is a metal-free conjugated polymer semiconductor with good physical and chemical stability, easy synthesis and abundant sources. However, existing carbon nitrides have some drawbacks: high recombination rate of charge, low electrical conductivity, and small specific surface area ($7.7$ $m^2g^{-1}$), which leads to limitations in practical applications. The technical scheme of the present invention adjusts the electronic structure, optical properties, changes the morphology, and improves the separation efficiency of charges, thereby improving the photocatalytic efficiency.

3. In the present invention, the preparation method of the defect-modified phosphorus-doped tubular carbon nitride micro-nano material is simple, the raw material is cheap and easy to obtain, and the cost is low. The morphology of D-PTCN has high reproducibility. D-PTCN has a high utilization rate of light absorption, and can efficiently treat NO in the exhaust gas.

DETAILED DESCRIPTION OF THE INVENTION

Embodiment 1

Figure 1:
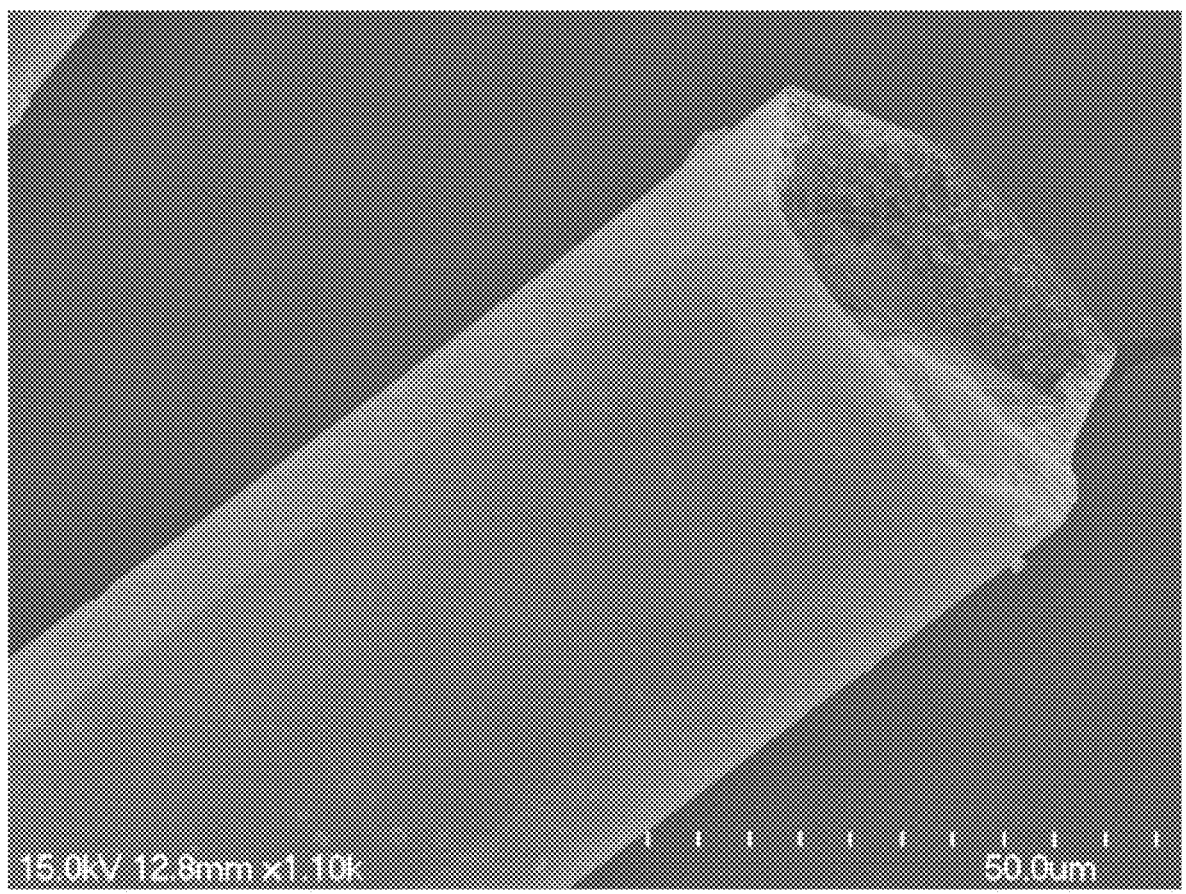
FIG. 1. SEM images of the phosphorus-doped tubular carbon nitride in the first embodiment.

Preparation of the phosphorus-doped tubular carbon nitride, the specific steps are as follows:

1 g of melamine and 1.2 g of phosphorous acid are added into 100 mL ultrapure water in a flask, which is stirred for 30 minutes under oil bath at 80° C. Then, the mixture is poured into a hydrothermal reactor and placed in an oven at 180° C. to react for 10 h. Next, the reactant is centrifuged and washed with ultrapure water, dried at 60° C., and then calcined at 500° C. for 4 h under the protection of argon atmosphere with a heating rate of 2.5° C./min to obtain phosphorus-doped tubular carbon nitride. FIG. 1 is a SEM image of the phosphorus-doped tubular carbon nitride, as can be seen from the Figure, the phosphorus-doped tubular carbon nitride has been successfully prepared.

Embodiment 2

Preparation of the defect-modified phosphorus-doped tubular carbon nitride micro-nano material, the specific steps are as follows:

The phosphorus-doped tubular carbon nitride obtained in the Embodiment 1 and $NaBH_4$ are mixed at a mass ratio of 5:1, then the mixture is heated at a low temperature (150° C., 200° C., 250° C. respectively) under an argon atmosphere for 30 minutes, the heating rate is 10° C./min. The obtained reaction product is washed with hydrochloric acid and sodium hydroxide solution, then washed with ultrapure water to neutrality, and dried at 60° C. to obtain a defect-modified phosphorus-doped tubular carbon nitride micro-nano material.

Figure 2:
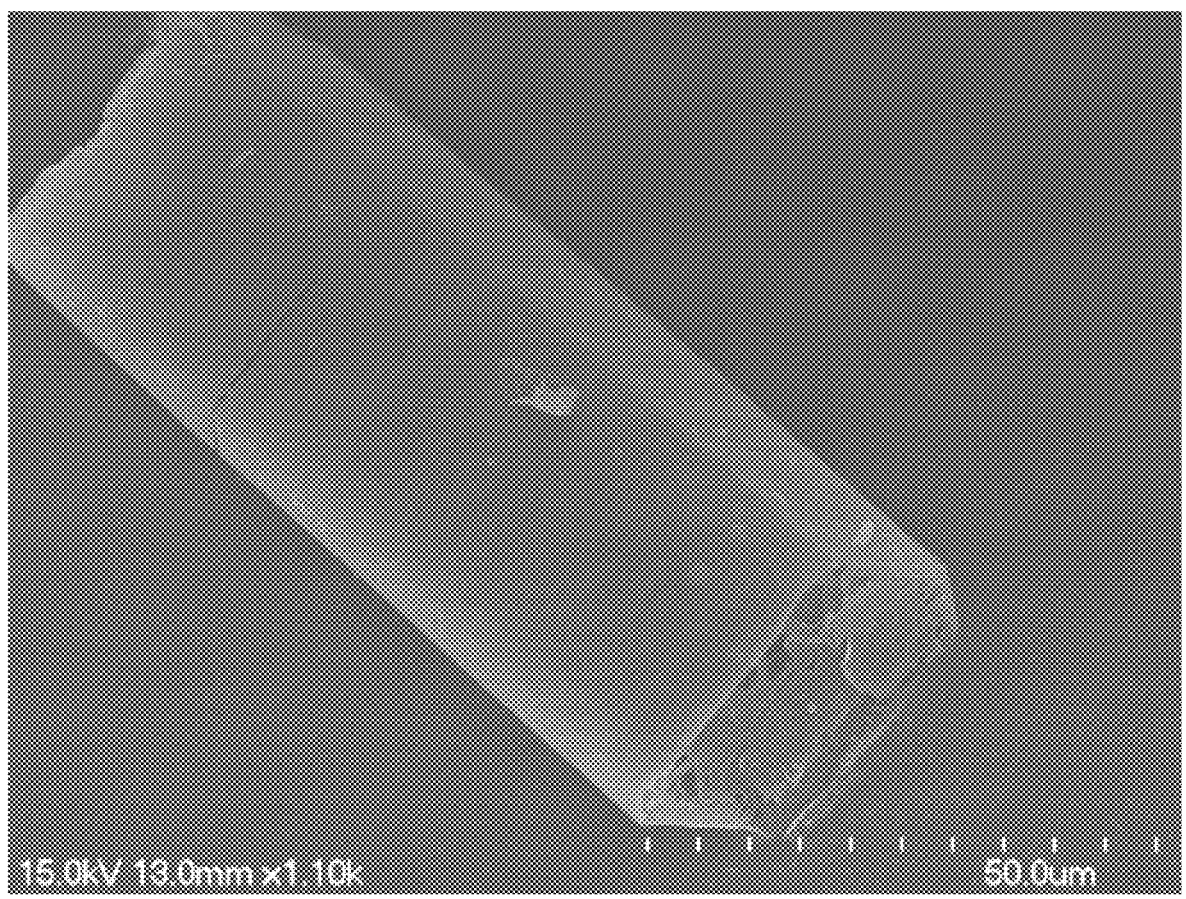
FIG. 2. SEM images of the defect-modified phosphorus-doped tubular carbon nitride in the second embodiment.

FIG. 2 is a SEM image of the defect-modified phosphorus-doped tubular carbon nitride micro-nano material (with the calcination temperature of 200° C.). It can be seen from the Figure that the method of low temperature calcination does not damage the structure of the tubular carbon nitride.

Embodiment 3

Visible-light photocatalytic activities of the defect-modified phosphorus-doped tubular carbon nitride micro-nano material for NO removal, the specific steps are as follows:

50 mg catalyst, defect-modified phosphorus-doped tubular carbon nitride (Embodiment 2), is tiled in the cylindrical reactor (1.6 L, Φ10×20 cm), which is used to remove NO (600 ppb) at atmospheric pressure. A 300 W xenon lamp as a light source is vertically equipped outside the reactor. The original concentration of NO gas is 10 ppm, after mixing with $N_2$, it is stabilized at a concentration of 600 ppb, and the gas flow rate is controlled at 2.4 L/min. After reaching the adsorption-desorption equilibrium between the NO and the catalyst, the xenon lamp is turned on and start timing, and record the data for 30 min.

Figure 3:
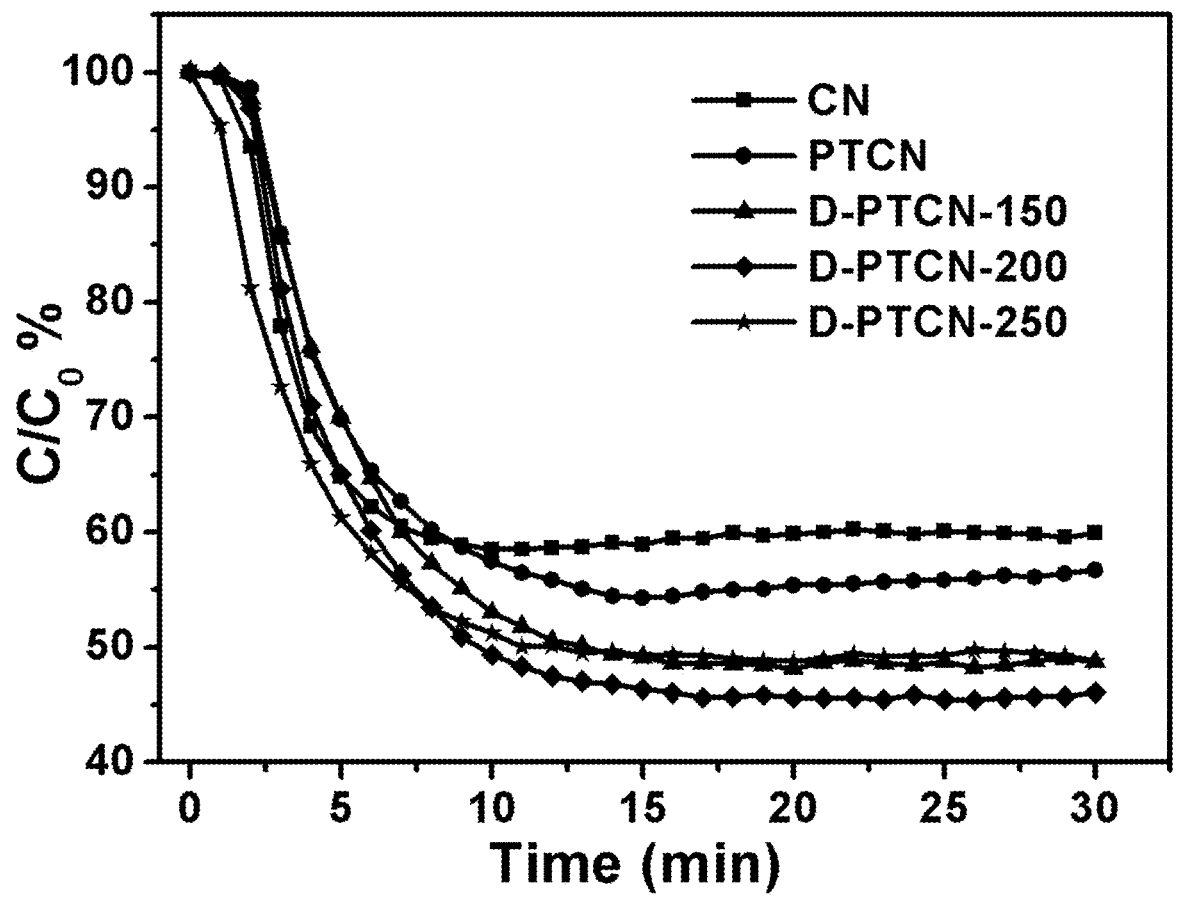
FIG. 3. Visible-light photocatalytic activities of the defect-modified phosphorus-doped tubular carbon nitride for NO removal in the second embodiment.

FIG. 3 is a graph of the relationship between the residual rate of NO and time. The carbon nitride is prepared by directly placing melamine powder in a tube furnace, under the protection of argon, with the heating rate of 2.5° C./min, calcining at 500° C. for 4 h. It can be seen from the figure that about 55% of NO is removed catalytically within 10 minutes under light irradiation conditions in the composite photocatalyst of the defect-modified phosphorus-doped tubular carbon nitride, after 30 minutes, the NO concentration keep steady. In this experiment, due to the enhancement of light absorption by defect modification, as well as tubular morphology, the catalytic efficiency of photocatalysts for NO is substantially increased.

The phosphorous-doped tubular carbon nitride prepared by using 0.5 g of melamine and other conditions unchanged in Embodiment 1 is used to prepare phosphorus-doped tubular carbon nitride micro-nano material by the method in Embodiment 2 (200° C.), and the NO photocatalytic degradation test is performed. After 30 minutes of light exposure, the final NO removal rate remained at about 42%; with 2 g of melamine, the final NO removal rate remained at about 44%. In Embodiment 2, when the mass ratio of the phosphorus-containing tubular carbon nitride and sodium borohydride is 5:3, the phosphorus-doped tubular carbon nitride micro-nano materials (200° C.) are prepared under the same conditions, and the above NO photocatalytic degradation test is performed. After 30 minutes of light exposure, the final NO removal rate remained at about 49%; when the mass ratio of phosphorus-containing tubular carbon nitride to sodium borohydride is 15:1, the final NO removal rate remained at about 46%.

Embodiment 4

Figure 4:
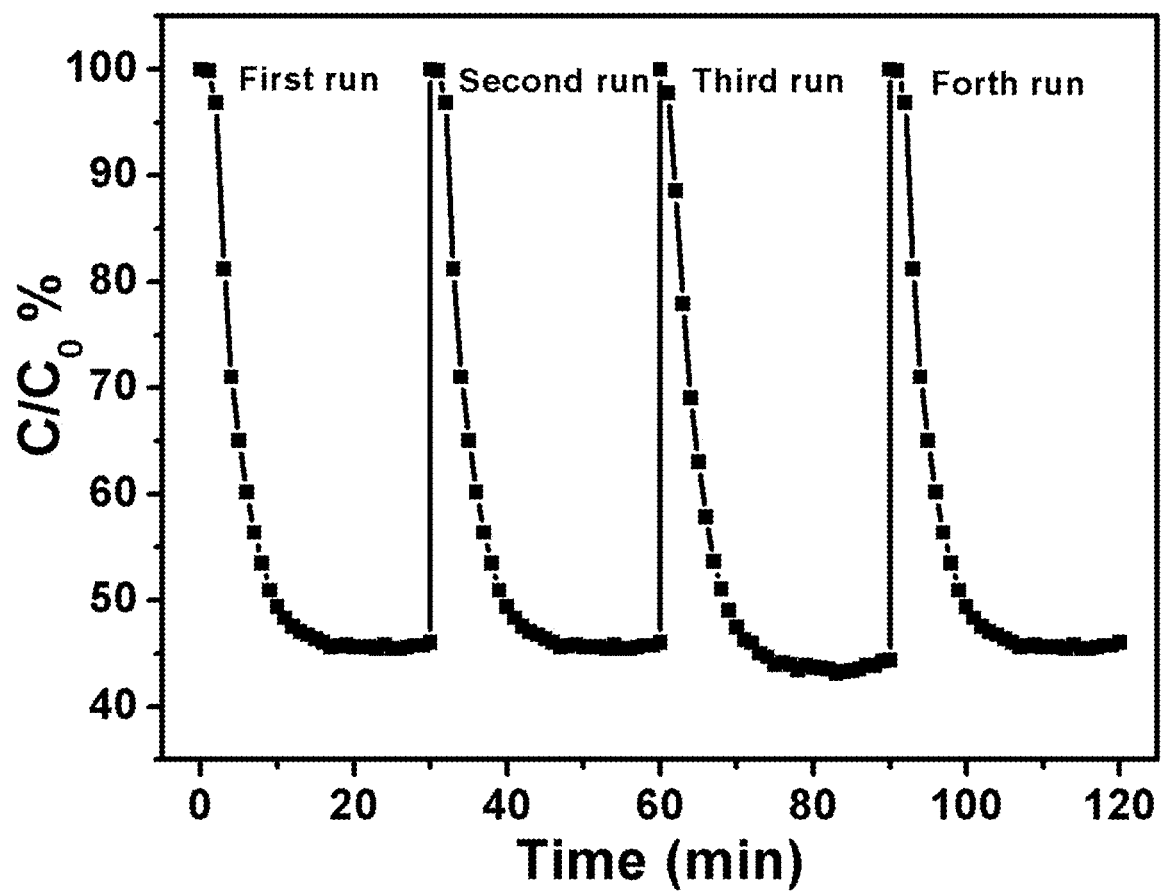
FIG. 4. Cycling run in the photocatalytic reaction process in the third embodiment.

Cyclic experiment of the defect-modified phosphorus-doped tubular carbon nitride micro-nano material for NO removal, the specific steps are as follows:

After the reaction is completed in Embodiment 3, turn off the xenon lamp and wait for the concentration of gas NO to return to 600 ppb again and keep stable. After the adsorption equilibrium is reached, turn on the xenon lamp and start timing. Record the data for 30 minutes. After that, the above operation is repeated and recorded four times to obtain the catalyst (calcination at 200° C.) cycle data. FIG. 4 is an effect chart of NO (600 ppb) removal in four-time cyclic photocatalytic experiment by using defect-modified phosphorus-doped tubular carbon nitride micro-nano material in the Embodiment 3. In the experiment, it can be seen that during the above three repeated uses, the composite material has high stability and always maintains excellent photocatalytic performance. Under the NO concentration of 600 ppb, the final removal efficiency of NO is more than 55%. Therefore, the catalyst can be reused and has good stability.

We claim:

1. An exhaust gas treatment method, consisting of the following steps:
   (1) in the presence of phosphorous acid and water, hydrothermally reacting melamine, and then calcining the melamine to obtain phosphorus-doped tubular carbon nitride,
   (2) mixing and calcing said phosphorus-doped tubular carbon nitride with sodium borohydride to obtain a phosphorus-doped tubular carbon nitride micro-nano material;
   (3) passing the exhaust gas to be treated through the phosphorus-doped tubular carbon nitride or the phosphorus-doped tubular carbon nitride micro-nano material, and completing the exhaust gas treatment under illumination,
   wherein in the step (1), the temperature of hydrothermal reaction is 180° C. and the time is 10 h; the calcination is carried out in an argon atmosphere, the heating rate is 2.5° C./min, the time is 4 h, and the calcination temperature is 500° C.; and the ratio of melamine, phosphorous acid and water is 1 g: 1.2 g: 100 mL;
   wherein in the step (2), the calcination is carried out in an argon atmosphere, the heating rate is 10° C./min, the time is 30 min, and the calcination temperature is 150° C. to 250° C.; and the mass ratio of said phosphorus-doped tubular carbon nitride and said sodium borohydride is 5:1; and
   wherein in the step (3), said illumination is provided by a 300 W xenon lamp.

* * * * *